No. 610,124. Patented Aug. 30, 1898.
H. P. DAVIS.
CONTROLLER FOR ELECTRIC MOTORS.
(Application filed Apr. 25, 1898.)
(No Model.) 7 Sheets—Sheet 5.
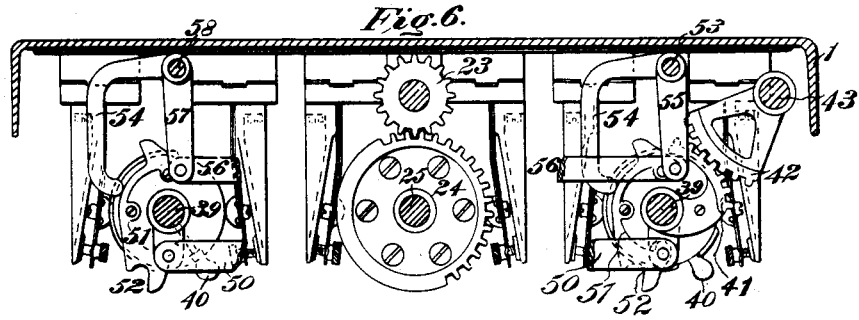
WITNESSES:
INVENTOR
Harry P. Davis
BY
Wesley G. Carr
ATTORNEY.
THE NORRIS PETERS CO., PHOTO-LITHO., WASHINGTON, D. C.

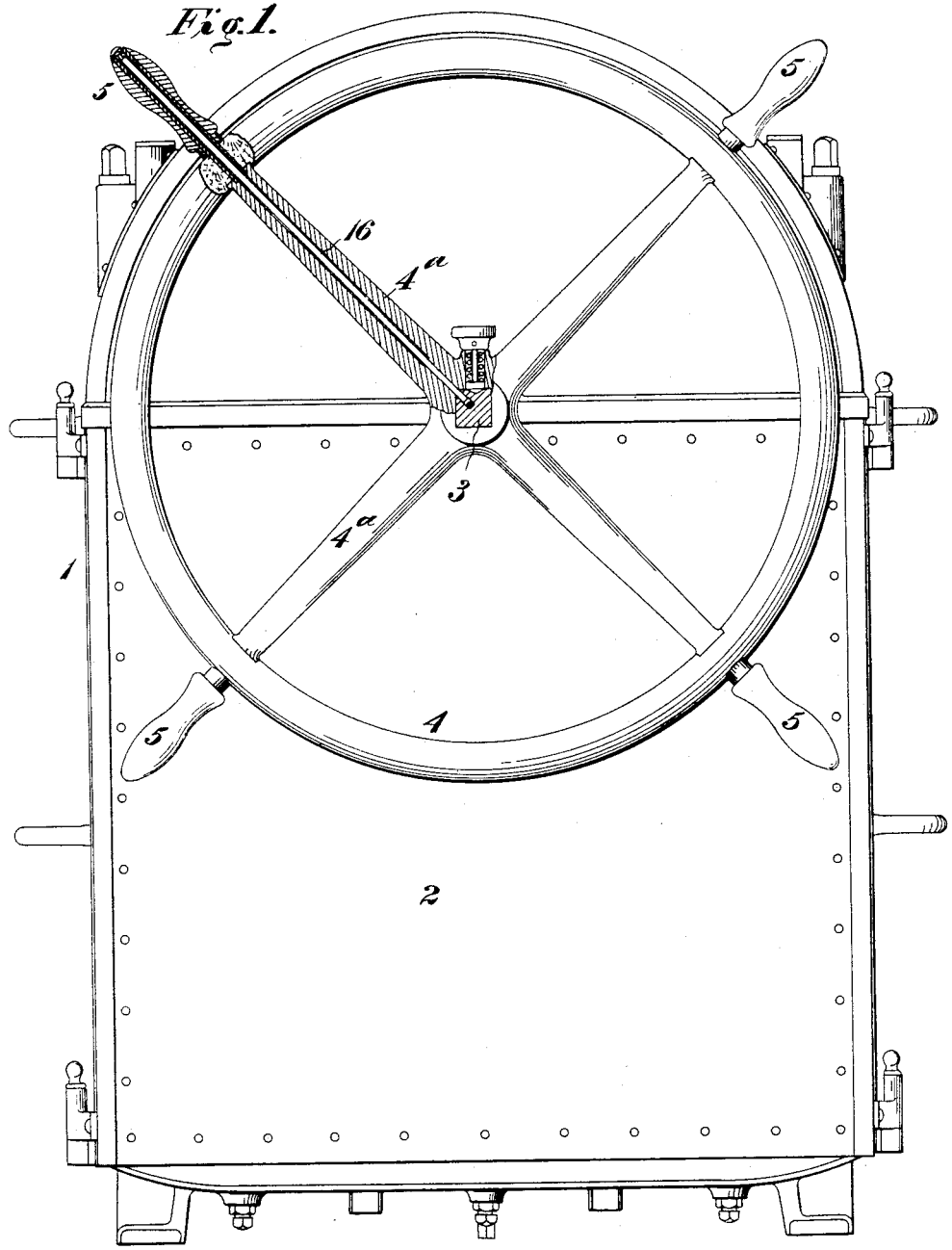

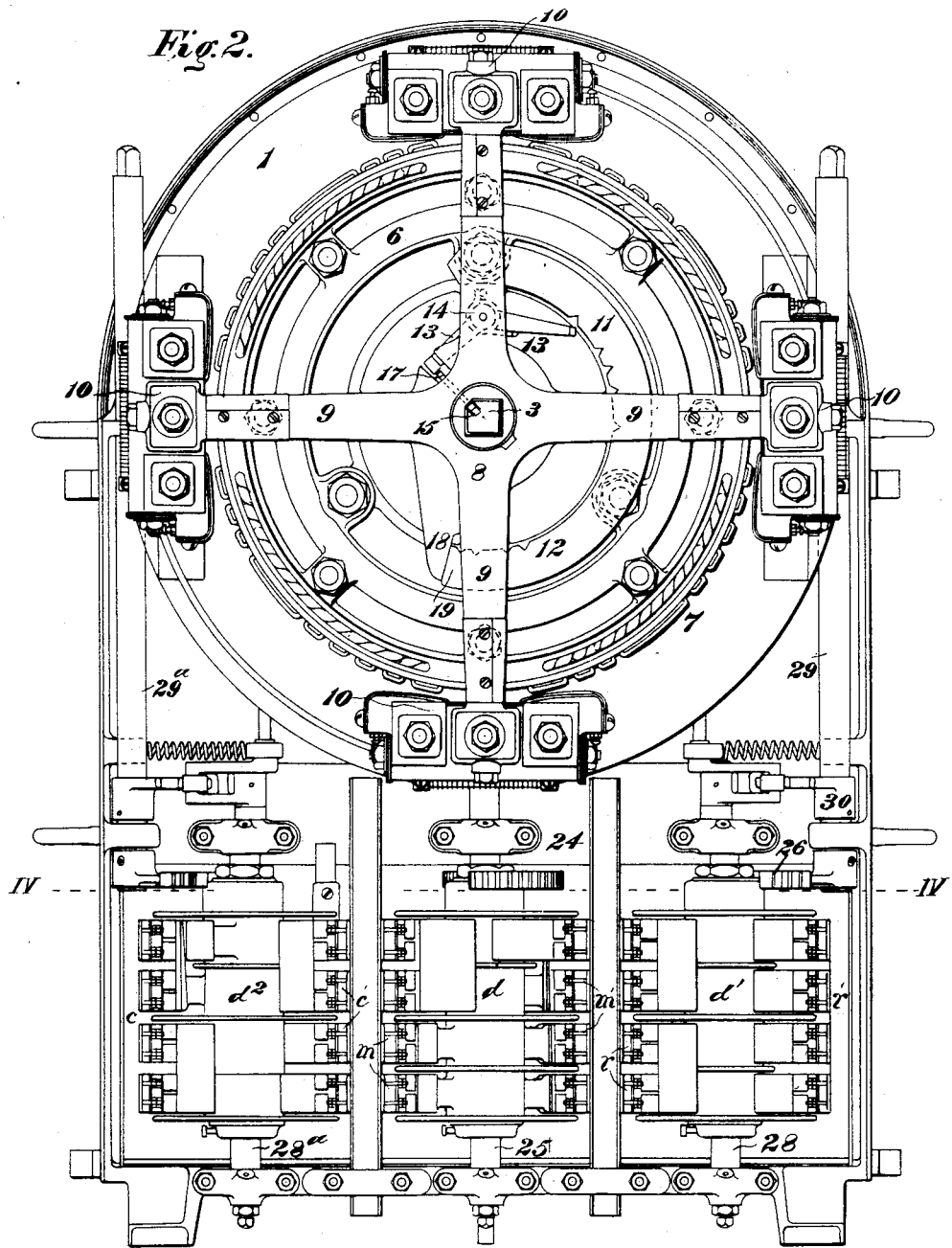

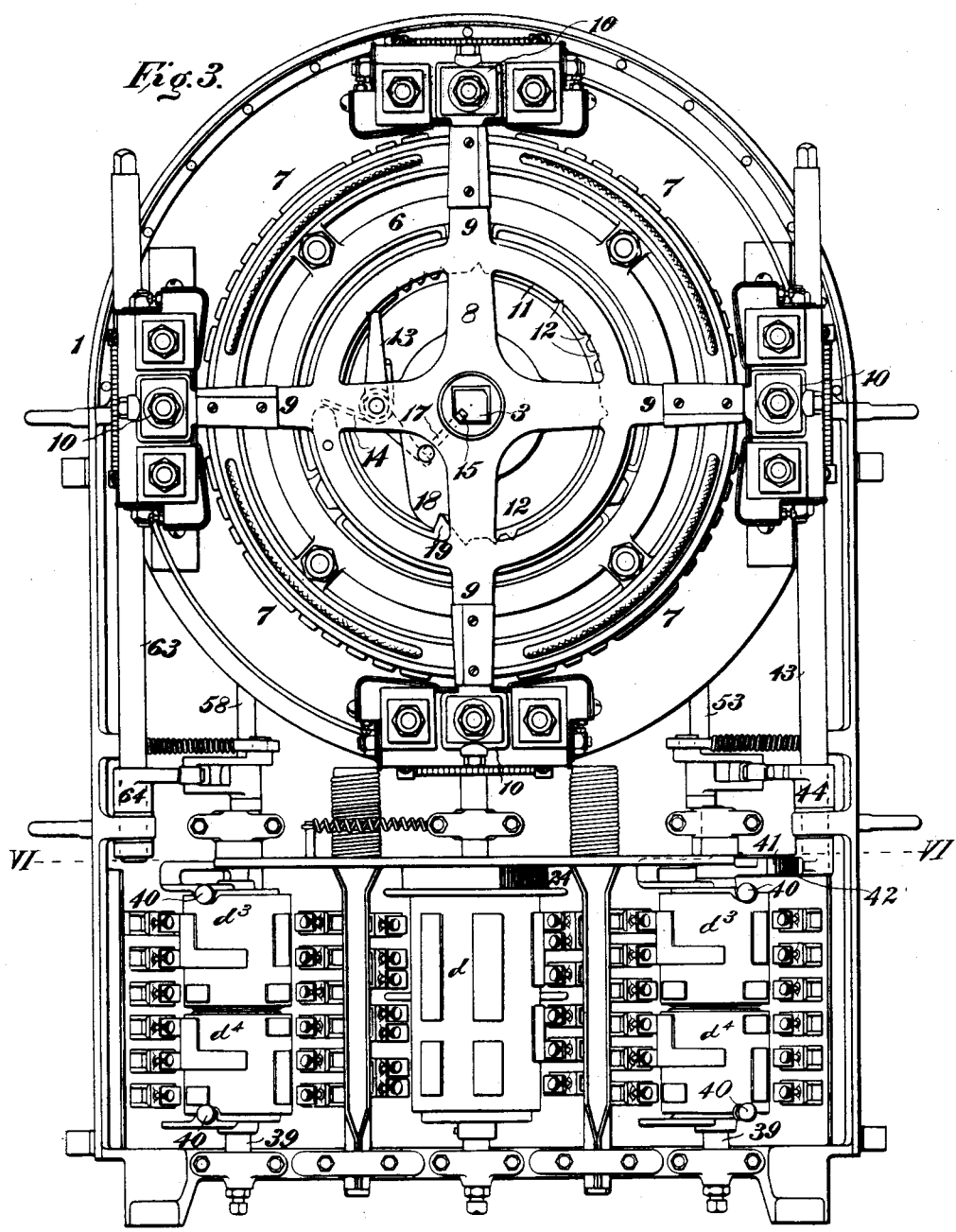

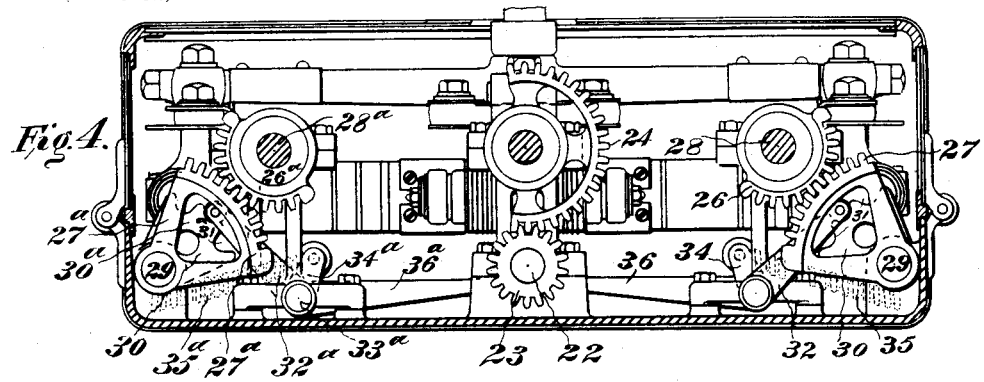
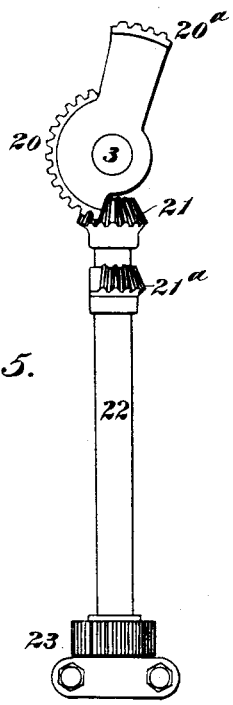

No. 610,124. Patented Aug. 30, 1898.
H. P. DAVIS.
CONTROLLER FOR ELECTRIC MOTORS.
(Application filed Apr. 25, 1898.)
(No Model.) 7 Sheets—Sheet 6.

WITNESSES: INVENTOR
Ethan T Dodds Harry P. Davis
Hubert C Tener BY
Aisley G Carr
ATTORNEY.

No. 610,124. Patented Aug. 30, 1898.
H. P. DAVIS.
CONTROLLER FOR ELECTRIC MOTORS.
(Application filed Apr. 25, 1898.)
(No Model.) 7 Sheets—Sheet 7.
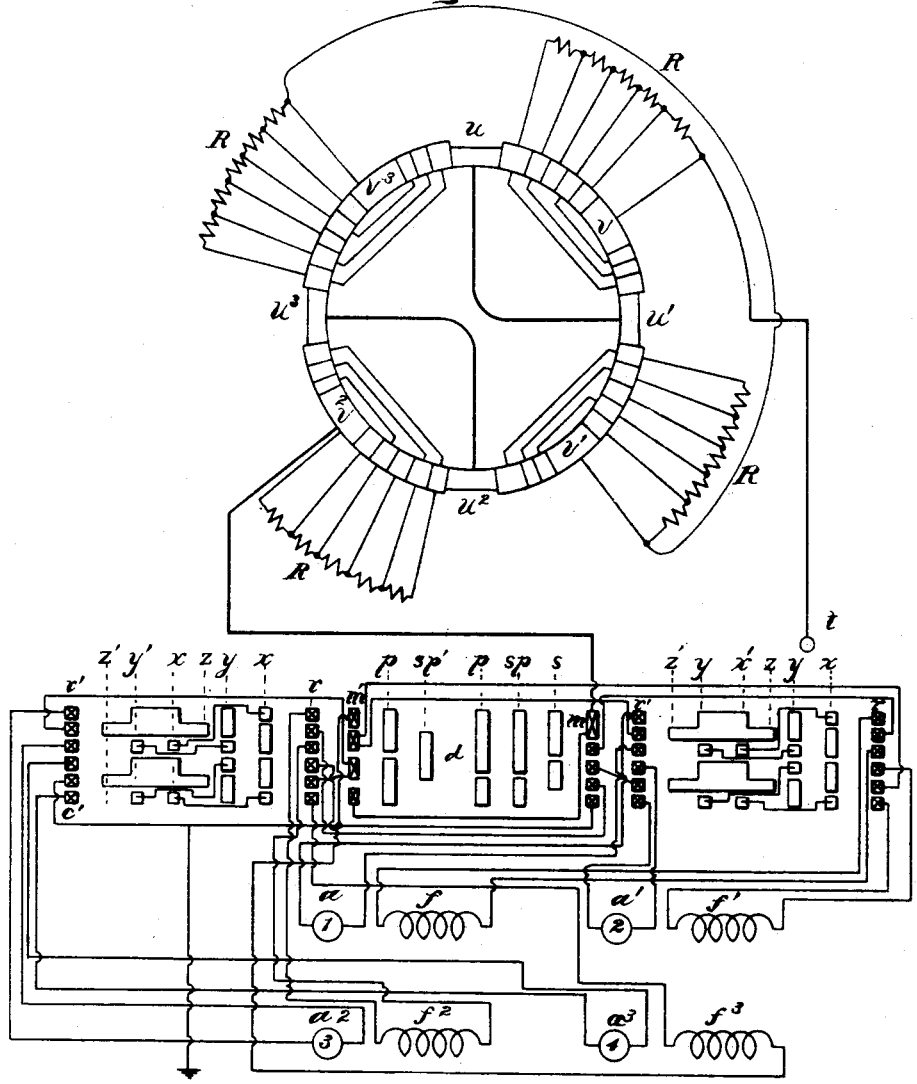
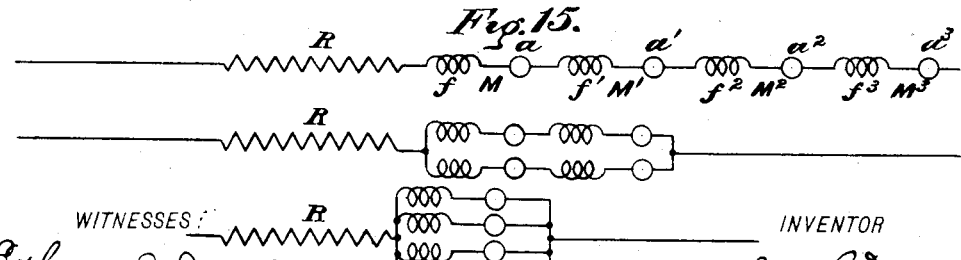
WITNESSES:
INVENTOR
Harry P. Davis
BY
ATTORNEY.

UNITED STATES PATENT OFFICE.

HARRY P. DAVIS, OF PITTSBURG, PENNSYLVANIA, ASSIGNOR TO THE WESTINGHOUSE ELECTRIC AND MANUFACTURING COMPANY, OF PENNSYLVANIA.

CONTROLLER FOR ELECTRIC MOTORS.

SPECIFICATION forming part of Letters Patent No. 610,124, dated August 30, 1898.

Application filed April 25, 1898. Serial No. 678,690. (No model.)

*To all whom it may concern:*

Be it known that I, HARRY P. DAVIS, a citizen of the United States, residing in Pittsburg, in the county of Allegheny and State of Pennsylvania, have invented a new and useful Improvement in Controllers for Electric Motors, (Case No. 777,) of which the following is a specification.

My invention relates to controllers for electric motors, and particularly to that class of controllers employed for controlling the power and speed of railway-motors of large capacity.

The object of my invention is to provide a controller of the general character above specified that shall embody means for varying the resistance of the motor-circuit through a wide range by comparatively small steps, at the same time avoiding the injurious arcing that is liable to accompany the use of heavy currents, and also to so construct and combine the several parts of the mechanism that they shall occupy a minimum amount of space and be so disposed as to operate effectively and satisfactorily under all conditions of service.

Figure 12:
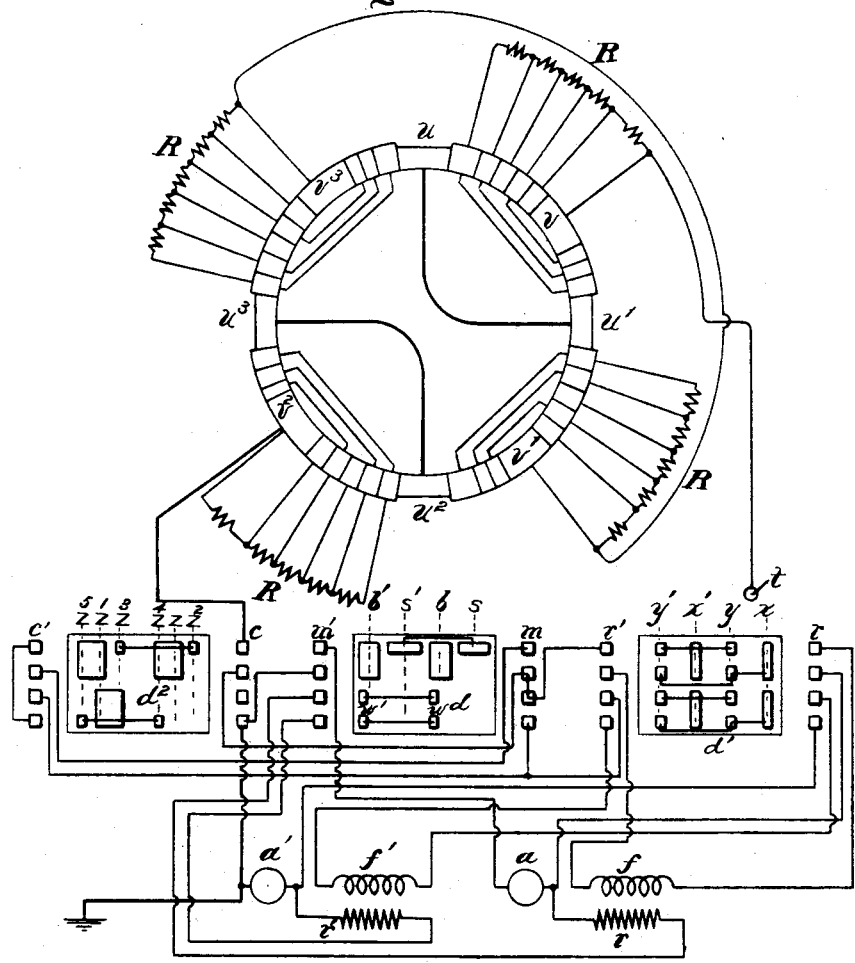
Figure 13:
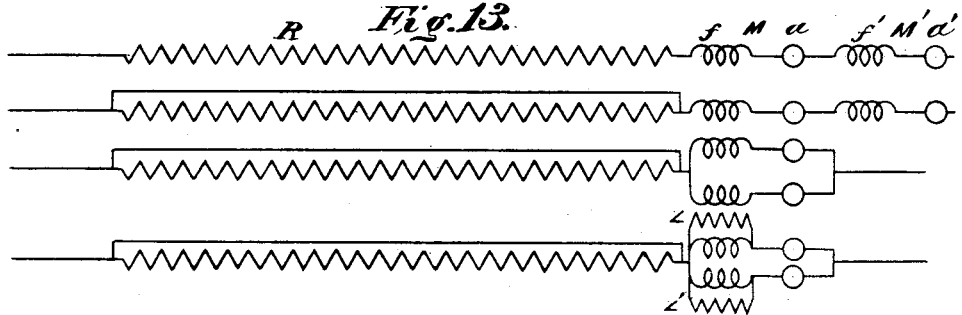

In the accompanying drawings, Figure 1 is a front elevation of my controller, a portion of the operating-wheel being shown in section. Fig. 2 is a front elevation of the operating parts of a controller adapted for controlling two motors, the cover being removed. Fig. 3 is a similar view of a controller designed for controlling four motors. Fig. 4 is a transverse sectional view of the controller shown in Fig. 2, the section being taken on line IV IV of the said figure. Fig. 5 is a detailed view of a portion of the gearing embodied in the controller shown in Figs. 2 and 4. Fig. 6 is a sectional view taken on line VI VI of Fig. 3. Fig. 7 is mainly a plan view of the controller shown in Fig. 3, the shafts and frame being, however, shown in section. Fig. 8 is a plan view of the series-parallel, the reversing, and the cut-out switches, the frame being shown in section. Figs. 9, 10, and 11 are detail views of certain portions of the interlocking mechanism. Fig. 12 is a diagram of the circuits of the form of controller shown in Figs. 2 and 4, and Fig. 13 is a diagram showing the relation of the motors and resistance for the four principal running positions. Fig. 14 is a diagram of the circuits of the controller shown in Figs. 3, 6, 7, and 8, and Fig. 15 is a diagram showing the relation of the motors and resistances for the three principal running positions.

I will first describe so much of the controller as is common to both of the modifications illustrated in the drawings, reference being had particularly to Figs. 1, 2, and 3. The base or frame 1 of the controller may be supported in position in the usual manner, preferably upon or adjacent to the dashboard of the car, and suitably hinged or otherwise fastened to the same is a cover 2 for the operating parts of the controller. The controller-operating shaft 3 is squared at its outer end, and on such squared end is fitted an operating-wheel 4, provided with spokes 4ª and handles 5.

Surrounding the shaft 3, but immovably supported upon the base 1, is the stationary member 6 of the resistance-varying switch, this member 6 being provided with four groups or sets of contact strips or plates 7, to which are permanently connected the resistance-coils R. Rigidly mounted upon the shaft 3 is a head 8, having four arms 9, the outer end of each of which supports a contact-brush 10, adapted to make contact with the several stationary contact plates or strips 7 as the shaft 3 is rotated. This switch is the same in construction and mode of operation, except as will be hereinafter pointed out, as the switch disclosed and claimed in my Patent No. 574,885, granted January 12, 1897, and a detailed description of the same is therefore not considered necessary in this application.

In order to insure a step-by-step movement of the contact-brushes 10, I provide a ring 11, with notches 12 therein corresponding to the respective positions where it is desired to make temporary stops in the revolution of the brushes 10. A lever 13 is pivoted to one of the arms 9, one end of which is normally pressed toward the notched edge of the ring 11 by a spring 14. A lever 15 is pivoted in a suitable recess in the side of the shaft 3, one arm of which rests normally against the end of a pin 16, extending through one of the spokes $4^a$ of the operating-wheel 4. The other end of the lever 15 is in position to engage the inner end of a pin 17, the outer end of the pin 17 resting against one end of the lever 13. It will be seen, therefore, that as the pin 16 is moved inward by means of pressure applied to its outer end the lever 15 will be rocked to push the pin 17 out against one end of the lever 13, and thus move the other end from the notch 12 in which it rests. If the pressure be removed from the pin 16, the end of lever 13 will obviously drop into the next notch and stop further rotation until the spring 16 is again pressed inward.

18 is a stop-piece or projection carried by the head 8 and engaging with a stationary shoulder or abutment 19 when the brushes are in the initial or zero position indicated in Fig. 2 of the drawings.

The inner end of shaft 3 is provided with a beveled gear-wheel or gear-segment 20, that meshes with a beveled pinion 21 on one end of a shaft 22, mounted in suitable bearings parallel to the base or back frame of the controller. In the form of controller shown in Figs. 2, 4, and 5 the shaft 3 is also provided with a beveled gear-segment $20^a$, arranged to mesh with a pinion-segment $21^a$ on the shaft 22 during a portion of the rotation of the shaft subsequent to the portion in which the segment 20 engages with the segment 21. The radius of the segment $20^a$ being very much greater than that of the segment 20, it is obvious that a given degree of rotation of the shaft 3 during the engagement of segment $20^a$ with the segment $21^a$ will serve to effect a greater degree of rotation of the shaft 22 than will be effected by the same degree of rotation when the segment 20 is in engagement with the pinion 21. The reason for this construction will be hereinafter more fully set forth.

The other end of the shaft 22 is provided with a pinion 23, that meshes with a gear-segment 24, mounted upon a shaft 25, the diameter of the segment 24 being materially greater than that of the pinion 23 for reasons that will be hereinafter explained.

Rigidly mounted upon the shaft 25 is a drum $d$, provided with contact plates or strips arranged, in the controller shown in Fig. 2, in the manner indicated in Fig. 12, and in the controller shown in Fig. 3 in the manner indicated in Fig. 14.

Arranged at one side of the drum $d$ is a series of contact-fingers $m$ and at the other side a series of contact-fingers $m'$, these being connected in circuit in a manner to be described, so that the position of the drum $d$ will determine the circuit connections of the motors with reference to each other.

In Figs. 2 and 4 the reversing-switch for the motors is shown at the right and comprises a drum $d'$, coöperating contact-fingers $r$ at one side and corresponding fingers $r'$ at the other side, and a gear-segment 26, with which meshes a gear-segment 27, the latter being rigidly mounted upon a rod 29, projecting out through the frame of the machine and provided with a squared end, to which may be fitted an operating-handle. The shaft 29 has also rigidly fastened upon it a head 30, provided with three notches 31, the middle one of which is a greater distance from the shaft 29 than the other two, as is usual in interlocking mechanism. An arm 32 is rigidly mounted upon a shaft 33 at one end and is provided at its other end with a roller in position to engage with any one of the notches 31, according to the position of the head 30. Another short arm 34, rigidly mounted on the shaft 33, is connected to the base of the controller by means of a coiled spring 35, the latter coöperating with such arm to press the roller in the end of arm 32 toward the head 30. A locking-lever 36 is rigidly mounted upon the shaft 33 and projects inward in position to lock the shaft 3 against rotation when the roller on the end of the arm 32 is in the middle notch 31 of the head 30.

At the other side of the series-parallel switch is a cut-out switch embodying a drum $d^2$ and coöperating contact-fingers $c$ on one side and $c'$ on the other side. The shaft $28^a$ of this drum $d^2$ is provided with a geared segment $26^a$, with which meshes a geared segment $27^a$, rigidly mounted upon a rod or shaft $29^a$, that projects outward through the frame and is provided with a squared end for the reception of a handle, as is the case with the shaft or rod 29 at the other side of the controller. This shaft $29^a$ has also rigidly fastened to it a head $30^a$, provided with notches $31^a$, with which coöperate an arm $32^a$, shaft $33^a$, arm $34^a$, spring $35^a$, and lever $36^a$, all substantially like the corresponding parts located at the other side of the controller and heretofore described, except that the arms 36 and $36^a$ have inner ends of different shape, as shown in Figs. 9 and 10. When the roller on the arm $32^a$ is in the middle notch on the head $30^a$, the shaft 3 is locked against rotation, and when such roller is in one of the side notches one of the controllers is cut out of circuit, and when in the other side notch the other controller is cut out of circuit. This will be understood by referring to Figs. 9, 10, and 11, in which are shown the locking devices.

37 is a sleeve pinned to shaft 3 and provided with a notch $37^a$ on one side and a wider notch $37^b$ on the other side. The sleeve 37 is also provided with an annular groove 38. Below the sleeve 37 is a guide 39 for the ends of levers 36 and $36^a$, this guide being loose upon shaft 3. When the roller on arm 32 is in the middle notch 31 in head 30, the free end of arm 36 is in the position shown in Fig. 9 and shaft 3 is locked against rotation, but when it is in either of the side notches the end of arm 36 is in groove 38 and the shaft is free to rotate. When the roller on arm $32^a$ is in the middle notch $31^a$, neither motor is cut out and the end of arm $36^a$ is in the groove 38, as is indicated in Fig. 9; but when it is in either of the side notches the end of arm $36^a$ is raised into the wide notch $37^b$ and the shaft 3 is permitted to rotate only a distance corresponding to a series connection of the motors. The operation of this controller and the relation of the several coöperating parts and the circuits will be more readily understood by referring to Figs. 12 and 14.

When the brushes 10 are in the respective positions indicated in Fig. 2, these positions being designated in Figs. 12 and 14 as $u$, $u'$, $u^2$, and $u^3$, the circuit is open. Assuming that the fingers $m\ m'$ are respectively in contact with the strips on the drum $d$ corresponding to positions $s\ s'$, that the brushes $r\ r'$ are respectively in positions $x\ x'$ on the drum $d'$, and that brushes $c\ c'$ are in the positions $z\ z'$ on the drum $d^2$, if the brushes 10 be moved from left to right to bring the same respectively into engagement with the first contact-pieces 7 of the respective sets the current will enter the controller from the trolley or other current-collecting device $t$ and pass through all of the resistance R and the motors M M' in series to ground. As the brushes 10 are moved step by step from left to right the resistance R will be cut out section by section until the brushes 10 are respectively in positions $v$, $v'$, $v^2$, and $v^3$, when all of the resistance will be cut out of circuit and the motors will be in series, as indicated in the second position, Fig. 13. As the brushes move from left to right from positions $v\ v'\ v^2\ v^3$ to positions $u'\ u^2\ u^3\ u$ the resistance will be cut in, section by section, and in passing over the insulating-segments at $u'\ u^2\ u^3\ u$ the circuit will be interrupted. The length of the contact-strips on the drum $d$ and the relation between the elements of the gearing between the two switches are such that the fingers $m\ m'$ will pass onto the strips corresponding to positions $p\ p'$, while the brushes are passing from points $u'\ u^2\ u^3\ u$ to the first contact-pieces 7 of the next succeeding sets, and when this point is reached the motors are connected in parallel with all of the resistance in circuit. This resistance is then gradually cut out by the movement of the brushes 10 until the points $v\ v'\ v^2\ v^3$ are reached, when the motors will be in parallel without resistance, as indicated in the third position in Fig. 13. A further rotation of shaft 3 a sufficient distance will bring gear-segment $20^a$, Fig. 5, into mesh with pinion-segment $21^a$, and thus quickly move drum $d$ to bring fingers $m$ and $m'$, respectively, into engagement with contact-strips $w$ and $w'$, as well as the corresponding wider strips. At the same time the resistance will be cut into and then out of circuit. In this final position the coils $l$ and $l'$ are connected in shunt to the respective field-magnets $f$ and $f'$ of the motors M and M'.

A slight degree of movement of the shaft 3 will effect the final step in the movement of the drum $d$ by reason of the gear ratio employed. This is necessary or at least very desirable on account of the limited range of movement of the brushes 10 of the resistance-varying switch.

In order to reverse the current in the field-magnet windings $f$ and $f'$ of the motors, the drum $d'$ will be turned to bring the brushes $r\ r'$, respectively, into positions $y$ and $y'$. The connections may be obviously made so as to reverse the current in the armatures $a$ and $a'$, if desired. In order to cut out motor M, the drum $d^2$ will be turned to bring the brushes $c\ c'$, respectively, into positions $z^2$ and $z^3$, and to cut out motor M' the drum $d^2$ will be rotated to bring the brushes $c\ c'$, respectively, into positions $z^4\ z^5$.

Referring now more particularly to the controller illustrated in Fig. 3 and Figs. 6 to 11, the series-parallel drum $d$ is provided with a greater number of contact-strips for the reason that there are four motors and it is desired to couple them in series, in series-parallel, and in parallel, the series connection being made when the brushes $m$ are in contact with the strips corresponding to position $s$, the series-parallel connection when the brushes $m$ and $m'$ are respectively in contact with the strips corresponding to the positions $s\ p$ and $s'\ p'$, and the parallel connection when the brushes $m$ and $m'$ are respectively in contact with the strips corresponding to positions $p$ and $p'$, the gearing between the shaft 3 and the drum $d$ being so proportioned that the change from series to series-parallel and from series-parallel to parallel will occur when the circuit is broken by the resistance-varying switch—i. e., when the brushes of said switch are in positions $u$, $u'$, $u^2$, and $u^3$, as has been already described in substance in connection with the two-motor controller. In this controller instead of employing a reversing-switch at one side and a cut-out switch at the other I employ two combined reversing and cut-out switches, one at each side of the series-parallel switch and each comprising two drums $d^3$ and $d^4$, normally fastened to a single shaft 39 by means of a suitable locking device 40, but independently detachable therefrom in order to cut out any one of the motors.

The gearing for the reversing-switch at one side is substantially the same as that heretofore described in connection with the controller for two motors and comprises a segment 41, rigidly mounted upon the shaft 39, and a gear-segment 42, meshing therewith and rigidly mounted upon the rod 43. This rod 43 also carries or is provided with a head 44, having the usual three notches 45, with which coöperate arms 46 and 47, coiled spring 48, and the locking-lever 36. The reversing-switch drums at the other side of the controller are operated simultaneously with those operated directly by the mechanism above described, the means for effecting this simultaneous operation comprising an arm 49, rigid on each shaft 39, and a connecting link or bar 50 between the said arms.

In order to cut out any one of the motors, I provide for each cut-out drum a cam-shaped plate 51, having a notch 52, the cam-plates for the drums $d^4$ being located at the bottom and those for the drums $d^3$ at the top. Rigidly mounted upon a shaft 53 at the rear of the right-hand drums $d^3$ and $d^4$ are elbow-levers 54, the outer ends of which respectively rest against the cam-surfaces of the corresponding plates 51. Each is pivotally connected by means of an arm 55 to one end of a bar 56, and the latter is pivotally connected at its other end to an arm 57, rigid on a shaft 58 at the other side of the controller. The shaft 58 is also provided with two elbow-levers 54 to coöperate with the cam-plates 51. The arm $36^a$ is also rigidly connected to shaft 58. When any one of the drums is unlocked from its shaft and turned from right to left, the free end of lever $36^a$ will be raised into the groove $37^b$, thus preventing movement of the shaft 3 beyond the position corresponding to a series connection of the motors.

An auxiliary means for preventing operation of the controller beyond the positions corresponding to series connection of the motors comprises a shaft or rod 63, provided with a notched head 64, and a crank-pin $64^a$, the latter being located beneath one of the brushes 10 in Fig. 3 and therefore not shown in that figure. (See Figs. 7 and 8.)

A two-armed lever 59 65 is loose upon shaft 58, and the free end of arm 65 is provided with a roller that engages with the notches in head 64. The free end of arm 59 has one end of a rod 60 pivoted to it. The free end of this rod is provided with a guide 61 and is moved outward to engage a stop 62 (see Fig. 7) on the movable member of the switch by the action of crank-pin $64^a$ upon a bifurcated lever 66, that is rigidly connected to lever 59 65, this action taking place when the shaft 63 is turned to bring the roller on arm 65 into the outer notch in head 64.

Referring particularly to Figs. 14 and 15, when the drums are in such position that the fingers $r$ and $r'$ are respectively in positions $x$ and $x'$ the motors are connected for movement in one direction and when these brushes are respectively in positions $y$ and $y'$ the motors are connected for movement in the opposite direction. When any drum is detached from its shaft and rotated to bring the brushes $r$ and $r'$, respectively, into positions $z$ and $z'$, the motor corresponding to this drum is cut out of circuit.

Except as otherwise hereinbefore specified the operation of this form of controller is the same as that of the form shown in Figs. 2, 4, 12, and 13.

I claim as my invention—

1. In a controller for electric motors, the combination with a resistance-varying switch having revolving brushes and a separate series-parallel switch, of gearing between the shafts of said switches, means for operating the first-named switch, a cut-out switch for each motor and means actuated thereby for preventing the operation of the series-parallel switch beyond the series positions when a motor is cut out.

2. In a controller for electric motors, the combination with a resistance-varying switch having a plurality of revolving brushes, of a series-parallel switch comprising a drum and coöperating contact-fingers, gearing between the shaft of said drum and the shaft of said brushes, cut-out and reversing switches and interlocking devices to prevent operation of any of said switches except when the others are in predetermined positions.

3. In a controller for electric motors, the combination with a resistance-varying switch and a series-parallel switch, the shafts of said switches being at right angles to each other, of gearing between said shafts, combined cut-out and reversing switches and interlocking mechanism, substantially as described.

4. In a controller for electric motors, the combination with a resistance-varying switch having a plurality of sets of stationary contacts and a plurality of coöperating revolving brushes, of a series-parallel switch having a drum and coöperating contact-fingers, the shaft of said drum and that of said brushes being at right angles, gears of different ratio between said shafts corresponding to different portions of the rotary movement of the brush-shaft, and means for applying power to said brush-shaft.

5. In a controller for electric motors, the combination with a resistance-varying switch and a series-parallel switch, of gearing between the shafts of said switches, combined cut-out and reversing switches and interlocking mechanism, substantially as described.

6. In a controller for four electric motors, the combination with a resistance-varying switch and a series-parallel switch, of gearing between the shafts of said switches, combined cut-out and reversing switches for the respective motors on two shafts and operating connections between said shafts whereby their simultaneous operation is insured.

In testimony whereof I have hereunto subscribed my name this 23d day of April, 1898.

HARRY P. DAVIS.

Witnesses:
WESLEY G. CARR,
H. C. TENER.